United States Patent
Clarkson

(10) Patent No.: US 11,095,490 B2
(45) Date of Patent: Aug. 17, 2021

(54) ORTHOGONAL PRECODING FOR SIDELOBE SUPPRESSION

(71) Applicant: THE UNIVERSITY OF QUEENSLAND, St Lucia (AU)

(72) Inventor: Ian Vaughan Lyndon Clarkson, The Gap (AU)

(73) Assignee: The University of Queensland, St Lucia (AU)

( * ) Notice: Subject to any disclaimer, the term of this patent is extended or adjusted under 35 U.S.C. 154(b) by 0 days.

(21) Appl. No.: 16/324,130

(22) PCT Filed: Aug. 7, 2017

(86) PCT No.: PCT/AU2017/050828
§ 371 (c)(1),
(2) Date: Feb. 8, 2019

(87) PCT Pub. No.: WO2018/027261
PCT Pub. Date: Feb. 15, 2018

(65) Prior Publication Data
US 2019/0182092 A1    Jun. 13, 2019

(30) Foreign Application Priority Data
Aug. 8, 2016 (AU) ................................ 2016903115

(51) Int. Cl.
*H04B 7/02* (2018.01)
*H04L 27/26* (2006.01)
*H04L 25/03* (2006.01)
*H04B 1/00* (2006.01)

(52) U.S. Cl.
CPC ........... *H04L 27/2636* (2013.01); *H04B 1/00* (2013.01); *H04L 25/03834* (2013.01); *H04L 27/26* (2013.01)

(58) Field of Classification Search
CPC ........... H04L 27/2636; H04L 25/03834; H04L 27/26; H04B 1/00
USPC ........ 375/267, 261, 260, 259, 219, 295, 316
See application file for complete search history.

(56) References Cited

U.S. PATENT DOCUMENTS

| 7,876,838 | B2 | 1/2011 | Clarkson et al. | |
|---|---|---|---|---|
| 2010/0310000 | A1 | 12/2010 | Ko et al. | |
| 2012/0099666 | A1* | 4/2012 | Baldemair | H04L 27/2617 375/260 |
| 2012/0140850 | A1 | 6/2012 | Khojastepour et al. | |
| 2012/0269286 | A1* | 10/2012 | Huang | H04L 27/2647 375/295 |
| 2013/0077466 | A1* | 3/2013 | Takaoka | H04W 72/0453 370/210 |

(Continued)

OTHER PUBLICATIONS

International Search Report for PCT/AU2017/050828 dated Oct. 17, 2017, 4 pages.

(Continued)

*Primary Examiner* — Zewdu A Kassa
(74) *Attorney, Agent, or Firm* — Nixon & Vanderhye P.C.

(57) ABSTRACT

A transmitter of a DFT-based communications system including an orthogonal precoder for transforming modulated data symbols using a unitary transform, wherein the data 5 symbols are mapped to subcarriers of the transmitter and the computational complexity of the transform is linear with respect to the number of the subcarriers.

18 Claims, 3 Drawing Sheets

(56) References Cited

U.S. PATENT DOCUMENTS

2013/0077660 A1* 3/2013 Ko .................. H04B 7/0473
  375/219
2013/0114654 A1 5/2013 Gomadam
2015/0358059 A1 12/2015 Kim et al.

OTHER PUBLICATIONS

Written Opinion of the ISA for PCT/AU2017/050828 dated Oct. 17, 2017, 4 pages.
Bischof, Christian, et al., "The WY Representation for Products of Householder Matrices," SIAM J. Sci. Stat. Comput., vol. 8, No. 1, Jan. 1987, pp. s2-s13.
Clarkson, I. Vaughan L., "Orthogonal Precoding for Sidelobe Suppression in DFT-Based Systems Using Block Reflectors," Proc. Internat. Conf. Acoust. Speech Signal Process., Mar. 2017, pp. 3709-3713.
Dietrich, G., "A New Formulation of the Hypermatrix Householder—QR Decomposition," Computer Methods in Applied Mechanics and Engineering, vol. 9, No. 3, Nov. 1976, pp. 273-280.
Fang, Juan, et al., "Resource Block Based Precoding Schemes for Suppressing Out-of-band Emission," IEEE Military Communications Conference, Nov. 2013, pp. 1570-1575, XP032563474.
Golub, Gene H., et al., "Matrix Computations," Third Edition, The Johns Hopkins University Press, 1996, 723 pages.
Kawasaki, Hikaru, et al., "Computational Complexity Reduction of Orthogonal Precoding for Sidelobe Suppression of OFDM Signal," Proceedings of Asia-Pacific Conference on Communications (APCC), Oct. 2015, pp. 460-463, XP032869269.
Ma, Meng, et al., "Optimal Orthogonal Precoding for Power Leakage Suppression in DFT-Based Systems," IEEE Transactions on Communications, vol. 59, No. 3, Mar. 2011, pp. 844-853.
Schreiber, Robert, et al., "Block Reflectors: Theory and Computation," SIAM J. Numer. Anal., vol. 25, No. 1, Feb. 1988, pp. 189-205.
Van De Beek, Jaap, "Orthogonal Multiplexing in a Subspace of Frequency Well-Localized Signals," IEEE Communications Letters, vol. 14, No. 10, Oct. 2010, pp. 882-884.
Xu, Renhui, et al., "A Precoding Scheme for DFT-Based OFDM to Suppress Sidelobes," IEEE Communications Letters, vol. 13, No. 10, Oct. 2009, pp. 776-777.
LTE; Evolved Universal Terrestrial Radio Access (E-UTRA); Physical channels and modulation, European Telecommunications Standards Institute Standard, Rev. 3GPP TS 36.211 version 13.0.0 Release 13, Jan. 2016, 143 pages.
Extended European Search Report dated Feb. 28, 2020, issued in European Application No. 17838208.1, 8 pages.

* cited by examiner

ORTHOGONAL PRECODING FOR SIDELOBE SUPPRESSION

This application is the U.S. national phase of International Application No. PCT/AU2017/050828 filed Aug. 7, 2017 which designated the U.S. and claims priority to AU Patent Application No. 2016903115 filed Aug. 8, 2016, the entire contents of each of which are hereby incorporated by reference.

FIELD

The present invention relates to sidelobe suppression in digital communications, and in particular to orthogonal precoding in a discrete Fourier transform (DFT) based communications system or device.

BACKGROUND

Sidelobe suppression is applied to modulated communications signals to keep interference with signals of adjacent frequency spectrums to a minimum. Communications systems based on the discrete Fourier transform (DFT), such as orthogonal frequency-division multiplexing (OFDM) and single-carrier frequency-division multiple access (SC-FDMA) are particularly susceptible to out-of-band power leakage. Although signal processing methods have been developed to suppress sidelobes in DFT-based systems, a satisfactory balance between computational complexity, which itself consumes additional energy (e.g. battery power), bit-error rate degradation and the out-of-band power leakage has remained elusive.

OFDM is part of communications standards for digital subscriber lines, cable broadband, wireless local area networks, digital video and audio broadcasting and fourth-generation mobile communications, i.e. 4G and LTE. Use of the DFT in OFDM improves spectral density, simplifies channel equalisation and minimises inter-symbol interference (ISI) in multi-path propagation. In an OFDM transmitter, portions of the transmitter's bandwidth can be turned on and off flexibly and this underpins orthogonal frequency-division multiple access (OFDMA). OFDM can also be used in cognitive radio.

OFDM however is sensitive to Doppler diversity, can suffer high out-of-band spectral leakage and can exhibit a relatively poor peak-to-average power ratio (PAPR). OFDM exhibits sidelobes which, away from the central band, diminish in power spectral density in proportion to the inverse square of the frequency. To keep the amount of interference within acceptable limits relatively wide guard bands are employed. In cognitive radio, where relatively narrow unused gaps in the spectrum can be exploited, wide guard bands are especially deleterious. In 5th-generation (5G) mobile wireless, supporting the "Internet of Things" will require device-to-device (D2D) communication on a much greater scale than is seen presently. The emerging paradigm is sometimes called "Massive Machine-Type Communication" (MMTC). D2D communication is typically low-rate and low-power. To accommodate D2D, 5G standards will likely relax synchronisation requirements in order to allow communicating devices to conserve power. So, like cognitive radio, D2D communication in 5G will need to exploit narrow "slots" in the available spectrum while only coarsely synchronised with other transmitters. Wide guard bands again cannot be tolerated.

For these reasons, there have been a number of proposals to reduce out-of-band radiation in OFDM. OFDM symbols can be filtered in the time domain to achieve arbitrarily high attenuation of sidelobes, but this introduces ISI. OFDM symbols may be windowed or undergo pulse-shaping, cyclic prefixes may be extended or subcarriers at the edge of the band may be deactivated, but this reduces spectral efficiency. These may all be termed linear approaches to sidelobe suppression.

Non-linear approaches have also been proposed. Adaptive symbol transition optimises short non-information bearing signal segments to be inserted between adjacent symbols to suppress sidelobes but again this reduces spectral efficiency. Cancellation carriers are subcarriers that are reserved to actively cancel sidelobe power but again spectral efficiency is reduced while PAPR is increased. Subcarrier weighting involves computing an optimal weighting on each subcarrier to suppress out-of-band power. Yet this can produce a degradation in bit-error rate (BER) versus signal-to-noise ratio (SNR) performance as the subcarriers do not receive equal amounts of power. A multiple-choice sequence method involves generating several candidate symbols using a set of agreed rules and selecting one for transmission that best suppresses out-of-band power. This method however requires side information to be transmitted so that the receiver knows which rule to apply in decoding the symbol.

In linear precoding, the data for transmission undergoes a linear transformation designed to confer some benefit. Different precoding schemes have been proposed for OFDM to counteract channel effects, suppress ICI, and reduce PAPR and the approaches can also be applied to sidelobe suppression. Some of the methods introduce correlation that degrade the orthogonality within each OFDM symbol and BER increases as a consequence. Orthogonal precoding methods however do not increase the BER, but there is some loss of spectral efficiency due to a loss of degrees of freedom in the OFDM symbol and there is a notable increase in computational complexity.

Orthogonal linear precoding, as respectively described in: "A precoding scheme for DFT-based OFDM to suppress sidelobes," R. Xu and M. Chen, *IEEE Communications Letters*, vol. 13, no. 10, pp. 776-778, October 2009 (Xu and Chen); "Orthogonal multiplexing in a subspace of frequency well-localized signals," J. van de Beek, *IEEE Communications Letters*, vol. 14, no. 10, pp. 882-884, October 2010 (van de Beek); and "Optimal orthogonal precoding for power leakage suppression in DFT-based systems," M. Ma, X. Huang, B. Jiao, and Y. J. Guo, *IEEE Trans. Commun.*, vol. 59, no. 3, pp. 844-853, March 2011 (Ma et al.), uses the null space of a precoding matrix with orthonormal columns to shape the spectrum of the transmitted symbol. The dimension of the null space is kept as small as possible in order to conserve the degrees of freedom available for data transmission. The precoding matrix is approximately square and is an otherwise unstructured matrix. Unfortunately applying the precoding matrix to the data vector of a data symbol to be transmitted is an expensive and complex data processing operation, and its complexity is quadratic in relation to the number of active subcarriers used by a transmitter.

SUMMARY

An embodiment of the present invention provides a transmitter of a DFT-based communications system, including:
an orthogonal precoder for transforming modulated data symbols using a unitary transform;

wherein the data symbols are mapped to subcarriers of the transmitter and the computational complexity of said transform is linear with respect to the number of the subcarriers.

An embodiment of the present invention also provides a receiver of a DFT-based communications system including:

an orthogonal decoder using a unitary transform for recovering modulated data symbols from precoded symbol vectors having data symbols allocated to subcarriers of the receiver, wherein that the computational complexity of the transform is linear with respect to the number of the subcarriers.

An embodiment of the invention also provides an orthogonal precoding process for a DFT based communications systems, including:

receiving modulated data symbols as a data vector; and applying a unitary transform to said data vector.

Preferably, the unitary transform is a generalised Householder transform, such as a block reflector. A block reflector is an orthogonal symmetric matrix transformation that can be applied to a data vector representing each of the symbols received by the precoder. The Householder transformation is a unitary transform, in fact a reflection, that maps a specified one-dimensional subspace to another. The complexity of a Householder transformation can be linear, rather than quadratic, in the dimension of the vector it transforms. Block reflectors generalise this by mapping between subspaces of arbitrary dimension. If the dimension of the subspace is regarded as constant, the complexity of block reflection is likewise linear in the dimension of the vector undergoing reflection. Accordingly, the use of a block reflector in orthogonal precoding dramatically reduces the computational cost.

Using a block reflector also does not alter the BER properties, since the precoding remains orthogonal, nor does it alter the spectral properties. The effect on PAPR can be almost negligible for OFDM. Block reflector precoding can also be applied to single-carrier frequency-division multiple access (SC-FDMA).

DRAWINGS

Preferred exemplary embodiments of the present invention will now be described further with reference to the accompanying drawings wherein.

DESCRIPTION

Figure 1:
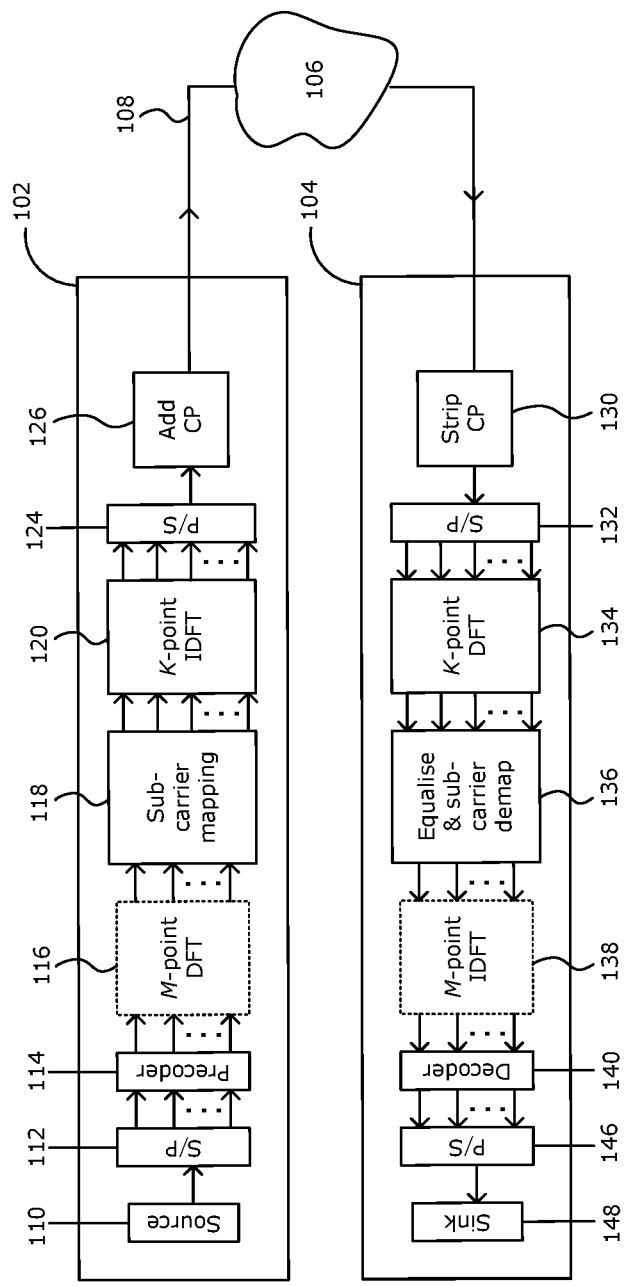
FIG. 1 is a block diagram of a DFT-based communications system.

A DFT-based digital communications system 100, as shown in FIG. 1, can use either OFDM or SC-FDMA to transmit data symbols of a data source 110. For SC-FDMA additional M-point DFT and IDFT modules 116 and 138 are used, and for OFDM the modules 116 and 138 are omitted.

The system 100 includes a transmitter 102 and a receiver 104. The transmitter 100 receives a stream of complex-valued symbols from the digital signal source 110, with the data of the signal to be transmitted encoded in the symbols using a modulation format such as QPSK or QAM. The data symbols are aggregated by a serial to-parallel converter (S/P) 112 into data vectors of length N to form an OFDM symbol. The group of symbols of the OFDM symbol can be represented as an uncoded symbol vector, $\bar{x} \in \mathbb{C}$ E $C^N$. The output of the S/P 112 is passed to an orthogonal precoder 114 to apply a precoding matrix $\bar{P} \in \mathbb{C}^{M \times N}$ $\bar{P}^H \bar{P}=I$, with M>N, that is used to generate a precoded symbol vector $\bar{\xi}$. For SC-FDMA, the precoded symbol vector is then Fourier-transformed by an M-point DFT 116.

A resulting subcarrier mapping input vector, s, contains the complex amplitudes which are assigned by a subcarrier mapper 118 to the subcarrier frequencies used by the transmitter 102 and receiver 104. That is, $$s=\bar{\xi}=\overline{Px} \text{ or } s=W\bar{\xi}=W\overline{Px}$$

for OFDM or SC-FDMA, respectively, where W is the matrix of coefficients of the unitary DFT module 116 whose elements are $$w_{k,\ell} = \frac{1}{\sqrt{M}} \exp\left[\frac{-j2\pi(k-1)(\ell-1)}{M}\right] \text{ for } 1 \le k, \ell \le M.$$

To unify the notation, $s=\overline{Qx}$ where $\overline{Q}=\overline{P}$ for OFDM or W $\overline{P}$ for SC-FDMA.

The uncoded symbol vector $\bar{x}$ has a smaller dimension than the precoded symbol vector, and a coding rate $\lambda=N/M$ which is less than unity. To consider an uncoded symbol vector that has the same dimension as the precoded vector a zero-padded uncoded symbol vector x can be defined as $$x = \begin{pmatrix} 0_R \\ \bar{x} \end{pmatrix}$$

where $0_R$ is a vector of all zeros having dimension R=M−N. Correspondingly, $$s=\xi=Px \text{ or } s=W\xi=WPx$$

for OFDM or SC-FDMA, respectively, where P is formed by prepending orthonormal column vectors to $\bar{P}$ to complete a basis of $\mathbb{C}^M$. That is, P is a unitary matrix.

As above, to unify the notation $$s=Qx. \qquad (1)$$

The subcarrier amplitudes $s_1, \ldots, s_M$ are mapped by the subcarrier mapper 118 to subcarriers $k_1, \ldots, k_M$ where each $k_i$ lies within an interval of length K≥M. A K-point inverse DFT module 120 produces a discrete time signal segment in vector form. A parallel-to-serial converter (P/S) 124 produces serial samples from the vector produced by the IDFT 120 and a cyclic prefix (CP) is prepended by a symbol CP prepender module 126. An advantage of DFT-based systems such as OFDM and SC-FDMA using a cyclic prefix (CP) is that simple equalisation can be carried out independently on each subcarrier. The OFDM or SC-FDMA symbol output by the CP module 126 is then converted to analog, filtered, amplified, up-converted and radiated by the transmitter 120 onto a communications channel 106 of a communications network 106 to the receiver 104. Although a cyclic prefix module 126 is used, orthogonal precoding as described herein is also applicable and effective when zero padding (ZP) is used instead of a CP.

The communications network 106 is a fixed or wireless telecommunications network that supports a digital communications channel 108 that uses DFT based communications processes such as OFDM or SC-FDMA. The network 106 may be a digital television or audio broadcasting network, DSL network, internet network, power line network and/or a 4G and next generation mobile network.

The receiver 104 performs the signal processing operations of the transmitter 102 in reverse order. The receiver 104 has a stripping module 130 to remove the cyclic prefix (CP) and pass the received symbol to a serial to parallel converter so it can be applied to a K-point DFT 134. The transformed vector produced is equalised and subcarrier demapped by a subcarrier demapper 136 to reconstruct the transmitted symbol vector. This is applied to an M-point IDFT module 138 for SC-FDMA. The symbol vector is then decoded by an orthogonal decoder 140 that applies and performs the reverse transformation to the precoder 114. The symbol vector output is then parallel to serial converted by a parallel to serial converter 146 to reproduce the original modulated signal (except it may include noise and interference) at a data sink 148 for subsequent demodulation and use.

The components of the transmitter 102 and receiver 104, including the precoder and decoder modules 114 and 140, are each implemented as an Application Specific Integrated Circuit (ASIC). Alternatively the components can be implemented using at least one Field Programmable Gate Array (FPGA) or in firmware on a Digital Signal Processor (DSP) chip, such as those produced by Altera Corporation, Xilinx Inc. and Texas Instruments Inc. The complex baseband continuous-time signal segment output by the transmitter 102 has the form $$y(t) = \sum_{i=1}^{M} s_i \exp(j2\pi k_i f_s t)$$

for $-T_{cp} \leq t < T_s$ where $f_s$ is the subcarrier spacing, $T_s = 1/f_s$ is the useful symbol duration and $T_{cp}$ is the cyclic prefix duration. The sum $T = T_{cp} + T_s$ is the symbol period.

With y(t) assumed to be zero outside the time interval $(-T_{cp}, T_s)$, its spectrum is $$Y(f) = \sum_{i=1}^{M} a_i^*(f) s_i \text{ where}$$

$$a_i(f) = T \exp[-j\pi(T_s - T_{cp})(f - k_i f_s)] \cdot \text{sinc}[(T_s + T_{cp})(f - k_i f_s)]$$

and sinc $(x) \triangleq \sin(x)/x$.

With the functions $a_i(f)$, $i=1, \ldots, M$, grouped as a column vector $a(f)$:

$$Y(f) = a^H(f) s.$$

Given that the transmitted signal is a train of symbols of the form y(t) transmitted serially, end-to-end over the channel 108, and with each symbol assumed to be independent of all others, the power spectral density (PSD) is $$G_Y(f) = \frac{\eta}{T} \|\overline{Q}^H a(f)\|^2 \quad (2)$$

where $\eta$ is the power assigned to each symbol in the source stream, i.e., the power assigned to each element of $\overline{x}$.

To suppress sidelobes, van de Beek describes selecting a set of out-of-band frequencies $M = \{f_1, \ldots, f_R\}$ such that the PSD $G_y(f_r) = 0$ for $r = 1, \ldots, R$. It follows from equation (2) that the vectors $a(f_1), \ldots, a(f_R)$ should be in the nullspace of $\overline{Q}^H$ and a matrix $C_{vdB} = (a(f_1), \ldots, a(f_R))$ can be generated such that $\overline{Q}^H C_{vdB} = 0$.

Alternatively, Ma et al. use a discrete set of out-of-band frequencies $\phi$, and designs $\overline{Q}$ to minimise $\Sigma_{f \in \phi} G_Y(f)$. A matrix $C_{Ma}$ is generated whose columns are $a(f)$ for each $f \in \phi$ and $\overline{Q}$ is set as the minimiser of $\|\overline{Q}^H C_{Ma}\|_F^2$, where $\|\cdot\|_F$ is the Frobenius norm.

In the approaches of both van de Beek and the Ma et al., $\overline{Q}$ is determined by first finding Q using a singular value decomposition (SVD) of the C matrix, either $C_{vdB}$ or $C_{Ma}$. The SVD is $$C = U \Sigma V^H \quad (3)$$

where U and V are unitary matrices ($V^H$ is the conjugate transpose) and $\Sigma$ is a diagonal matrix with nonnegative real elements (the singular values) on the diagonal in descending order. Q=U is selected to achieve sidelobe suppression. The matrix U is partitioned so that $U = (\tilde{U}, \overline{U})$ where $\tilde{U}$ represents the first R columns of U and $\overline{U}$ the remaining N columns. Then $\overline{Q} = \overline{U}$.

Although Q=U achieves sidelobe suppression using the methods of van de Beek and Ma et al. any choice for Q that maintains the orthogonality of the subspaces spanned by the columns of $\tilde{U}$ and $\overline{U}$ will also be admissible, i.e., $Q = (\tilde{U}\tilde{\Psi}, \overline{U}\overline{\Psi})$ is also admissible for any unitary matrices $\tilde{\Psi}$ and $\overline{\Psi}$.

A Householder reflection (or transform) is a process that is used to effect a unitary transformation mapping of vectors from a specified one-dimensional subspace to another (and vice versa). If y≠z are unit basis vectors for the two subspaces then the Householder matrix $$H = I - gg^H \text{ where } g = \sqrt{2} \frac{y - z}{\|y - z\|} \quad (4)$$

can be used and verified that it is unitary because $Hy = z$ and $Hz = y$.

The vector g is known as the Householder vector. As the basis vectors are not unique, it follows that the Householder matrix to effect the desired reflection is also not unique.

The complexity (for example the number of floating-point operations) necessary to compute a Householder reflection on a vector v appears to be proportional to the square of the dimension of v, since computation of Hv is an instance of matrix-vector multiplication. However, from equation (4) it can be determined that $Hv = v - g(g^H v)$, and it then follows that the Householder reflection can instead be computed using an inner product, a scalar-vector multiplication and a vector subtraction. The complexity of each of these operations is only linear in the dimension of v.

A generalised Householder reflection is a unitary transformation that maps between a pair of specified subspaces with dimension $\rho > 1$. Suppose Y is a matrix whose $\rho$ columns form an orthonormal basis of one subspace and Z likewise yields the basis of the other. Further suppose that the singular value decomposition (SVD) of $Y^H Z$ is $\Theta D \Phi^H$ and that all the singular values are less than unity (i.e., the intersection of the two subspaces contains only 0). A block reflector H can be derived in the form $$H = I - GG^H \text{ where } G = (Y\Theta - Z\Phi)(I - D)^{-1/2} \quad (5)$$

It is verified that H is unitary as $HY\Theta = Z\Phi$ and $HZ\Phi = Y\Theta$.

For fixed ρ, the arithmetic complexity of computing a generalised Householder reflection on a vector v using a block reflector is linear, not quadratic, in the dimension of v.

Alternative processes for implementing block reflectors based on the polar and Cholesky decompositions are described in "A new formulation of the hypermatrix Householder-QR decomposition," G. Dietrich, *Comput. Methods Appl. Mech. Engrg.*, vol. 9, no. 3, pp. 273-280, November 1976 (Dietrich); and "Block reflectors: Theory and computation," R. Schreiber and B. Parlett, *SIAM J. Nurner. Anal.*, vol. 25, no. 1, pp. 189-205, February 1988 (Schreiber et al.). As for Householder matrices, block reflectors are not unique for any specified pair of subspaces.

To achieve sidelobe suppression in the orthogonal precoder 114, a block reflector H is constructed that maps from the subspace spanned by $e_1, \ldots, e_R$, where each vector $e_i$ is the $i^{th}$ column of the identity matrix I, to the subspace spanned by the first R columns of U in equation (3) for OFDM or of $W^H U$ for SC-FDMA, i.e., $\tilde{U}$ or $W^H \tilde{U}$, respectively. To construct the block reflector, H, equation (5) is applied with $$Y = (e_1, \ldots, e_R) \text{ and } Z = \begin{cases} \tilde{U} \text{ for OFDM or} \\ W^H \tilde{U} \text{ for SC-FDMA} \end{cases} \quad (6)$$

The resulting block reflector has the properties required for sidelobe suppression. The first R columns of H span the same subspace as U (respectively, $W^H \tilde{U}$) and the remaining columns span a subspace which is orthogonal to it. Therefore, H is an acceptable assignment for P, the precoding matrix.

From equation (5), a computationally efficient way to compute the precoded symbol vector ξ is to evaluate the expression $$\xi = x - G(G^H x) \quad (7)$$

In doing so, the computational cost of performing orthogonal precoding becomes linear rather than quadratic in M, if R is a constant.

Accordingly to implement the precoder 114, the matrices defined by Y and Z are determined using equation (6), the singular value decomposition of $Y^H Z$ is obtained and G is determined directly from the right hand side of equation (5). Whilst H can then be derived using the left hand side of equation (5), to implement the precoder 114 (such that the computational complexity is linear using equation (7)) the block reflector H never has to be explicitly determined. Equation (7) allows data symbols to be mapped from one subspace to another using a linear function. Once the matrix G is determined to meet a desired operational sidelobe profile, its values are encoded in the circuitry of, or stored in memory associated with, the precoder 114 of the transmitter 102 and decoder 140 of the receiver 104.

Figure 2:
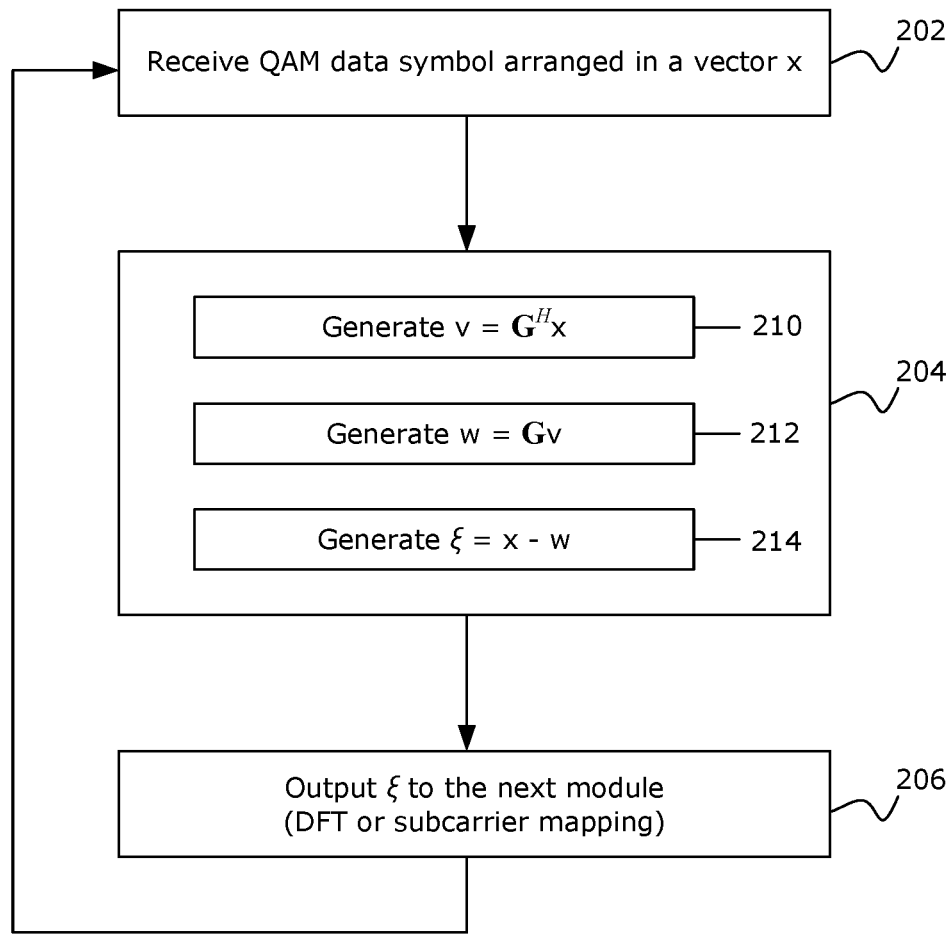
FIG. 2 is a flow chart of an orthogonal precoding process used by the system.

The precoder 114 executes an orthogonal precoding process as shown in FIG. 2. The precoder 114 receives a symbol of QAM data from the serial parallel converter 112 as vector x (step 202). The precoder 114 then transforms vector x (204) using a block reflector to produce a precoded symbol vector ξ by first generating vector v by applying the matrix $G^H$ (210). The precoder then generates w=Gv (212), and subsequently it generates ξ=x−w (214). The vector ξ is then output (206) by the precoder 114 to the DFT 116 for SC-FDMA or to the subcarrier mapper 118 for OFDM. The process is then repeated for the next symbol.

The decoder 140 performs the reverse or inverse process to the precoder 114 in order to recover the vector x from the vector ξ. The decoder recovers the uncoded symbol vector using:

$$x = \xi - G(G^H \xi),$$

from each received precoded symbol vector ξ.

The above overcomes what is widely seen as a major impediment to orthogonal precoding. Normally the complexity of orthogonal precoding and decoding has order of O($M^2$), which is unacceptable when M is large. Conventional orthogonal precoding needs computations between matrices with great dimensions and are always too complicated especially when the number of available subcarriers is large. For example, both the precoders of Xu and Chen and Ma et al have the advantage of maintaining the receiver SNR, but their computational complexity is proportional to the square of the number of subcarriers.

Figure 3:
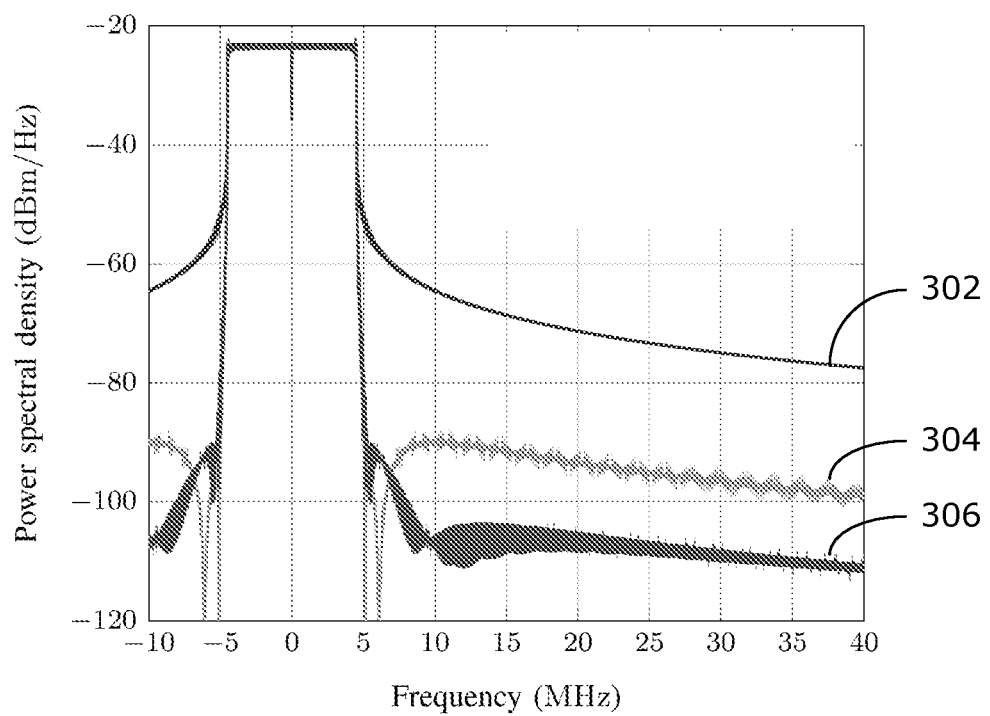
FIG. 3 is a block diagram of a power spectral density of orthogonally precoded OFDM signals based on E-UTRA parameters.

Using the E-UTRA/LTE parameters described in *LTE; Evolved Universal Terrestrial Radio Access (E-UTRA); Physical channels and modulation*, European Telecommunications Standards Institute Standard., Rev. 3GPP TS 36.211 version 13.0.0 Release 13, Jan. 2016, a transmitter 102, as described in van de Beek, uses K=2048 available subcarriers at 15 kHz spacing, and M=600 subcarriers modulated for transmission using QPSK with a subcarrier mapping such that $-300 \leq k_i \leq 300$, $k_i \neq 0$. For the cyclic prefix, $T_{cp}=917128$. The transmitted power is 46 dBm. As shown in FIG. 3, the power spectral density (PSD) for standard OFDM 302 exhibits the characteristic "flat top" of approximately −23 dBm/Hz. Then there is a relatively slow decay of the power in the sidelobes, not quite reaching −80 dBm/Hz at a distance of 40 MHz from the centre frequency.

The PSDs 304 and 306, also shown in FIG. 3, were obtained using the orthogonal precoding methods of van de Beek and Ma et al., respectively, but altered to instead use a block reflector H as described above. The two methods have differences that give rise to a different matrix G that is derived and used in the process of FIG. 2. The matrix G was determined by:
1. Generating the matrix $C_{vdB}$ or $C_{Ma}$ as described above for the methods of van de Beek and Ma et al.
2. Determining the singular value decomposition (SVD) of this matrix to produce the matrices U, Σ and V as in equation (3).
3. Extracting the first R columns of U into a matrix $\tilde{U}$.
4. Using equation (5) to determine G from Y and Z as defined by equation (6), and as discussed above.

Note that, in this last step, the right hand side of equation (5) may be substituted by other methods to generate block reflectors, such as those described in the articles of Dietrich and Schreiber et al, in order to generate the matrix G.

To produce the examples 304 and 306 in FIG. 3, R=8, so N=592 and the coding rate falls slightly to 592/600. For the van de Beek process with a block reflector, the spectrum 304 is nulled at the frequencies ±5100±1 and ±6100±1 kHz. The out-of-band PSD 304 is dramatically lower than standard OFDM 302, almost universally 20 dBm/Hz lower. For the adjusted Ma et al. process, the PSD 306 has spectral leakage minimised at frequencies from −40 MHz to −5 MHz and from 5 MHz to 40 MHz, sampled at intervals of 200 kHz. A further out-of-band attenuation of approximately 10 dBm/Hz is evident. The BER properties are unchanged with respect to orthogonal precoders as they were originally described in Xu and Chen, van de Beek and Ma et al.

Accordingly, orthogonal precoding using block reflectors achieves excellent sidelobe suppression. For OFDM, there is almost no PAPR penalty for using orthogonal precoding and it can be less than 0.1 dB for the E-UTRA/LTE parameters for the transmitter 102. For SC-FDMA, a penalty is evident, but may not exceed 1.5 dB and the penalty is no greater for the use of block reflectors as against other orthogonal precoders.

Additional or supplementary generalised Householder reflections can also be applied to reduce PAPR in SC-FDMA. That is, one set of reflections is applied to suppress out-of-band emissions and another is applied to reduce PAPR. This second set of PAPR-reducing reflections operates in the subspace orthogonal to the nullspace used for sidelobe suppression. Given the precoding matrix Q=H already described, a small number, S, of columns is chosen for remapping via Householder reflection. One criterion for selecting columns for remapping is the sup-norm, i.e., a column $q_j$ is chosen for remapping if $\|q_j\|_\infty$ is small for some j. Each such column is mapped to a new vector, $v_j$, in the range space of $\overline{Q}$, so as not to interfere with the out-of-band power suppression. One criterion for selecting $v_j$ is again its sup-norm, i.e., $v_j$ is chosen so that $\|v_j\|_\infty$ is large. For instance, the normalised orthogonal projection of $e_j$ onto the range space of $\overline{Q}$ is one such choice. To perform the mapping just described, the following process is executed for the precoder 114 iteratively:
1. Construct vectors y and z from $e_j$ and $q_j$ by zeroing the elements corresponding to the subcarriers previously subjected to sidelobe supression and any previously remapped subcarriers, renormalising if necessary.
2. Compute the Householder vector g as described in equation (4).
3. Replace Q by $Q(I-gg^H)$ and repeat from Step 1 for the next chosen subcarrier until S subcarriers have been remapped.

The set of Householder vectors g thus obtained constitutes a supplementary generalised Householder reflection for PAPR reduction and these vectors are encoded in the circuitry or stored in memory of the precoder 114 in order to execute the reflection.

For sidelobe suppression, block reflectors are preferred for their simplicity but other linear-time (i.e. the computational complexity is linear in relation to the number of subcarriers the symbols are mapped to) generalised Householder reflections can be substituted.

For instance, successive Householder reflections may be applied instead of a block reflector. Using Y and Z of equation (6), Householder vectors $g_1, \ldots, g_R$ can be determined using the following process:
1. Set i:=1 and set A:=Z.
2. Calculate g in equation (4) using $y=e_i$ and $z=(0, \ldots, 0, a_{ii}, \ldots, a_{Mi})$, after first normalising z. Denote this Householder vector $g_i$.
3. Update A so that $A:=A-g_i(g_i^H A)$.
4. Increment i.
5. If i≤R, repeat from step 2 above, otherwise finish.

Once the set of Householder vectors $g_1, \ldots, g_R$, are determined, the precoder 114 generates a precoded symbol vector ξ from an uncoded symbol x by executing the following process:
1. Set i:=1 and set ξ:=x.
2. Update ξ so that $\xi:=\xi-g_i(g_i^H \xi)$.
3. Increment i.
4. If i≤R, repeat from step 2, otherwise finish.

The precoded symbol is decoded by applying the individual Householder reflectors in the opposite order.

As another alternative, the Householder vectors $g_1, g_R$ can be combined into matrices W and Y by performing the following:
1. Set W:=$-g_1$, Y:=$g_1$ and i:=2.
2. Update W and Y so that W:=(W, $-g_i-WY^H g_i$) and Y:=(Y, $g_i$).
3. Increment i.
4. If i≤R, repeat from step 2, otherwise finish.

Given W and Y, which are both M×R matrices, the precoded symbol vector ξ is generated from an uncoded symbol x by determining $\xi=x+W(Y^H x)$. Likewise, the precoded symbol is decoded by evaluating the expression $x=\xi+W(Y^H \xi)$. This is a WY representation for products of Householder reflections as discussed in *Matrix Computations, G. H. Golub and C. F. van Loan,* 3rd ed. Johns Hopkins University Press, 1996; "The WY representation for products of Householder matrices", C. Bischof and C. van Loan, *SIAM J. Sci. Stat. Comput.*, vol. 8, no. 1, pp. s2-s13, January 1987; and "A storage-efficient WY representation for products of Householder matrices", R. Schreiber and C. van Loan, *SIAM J. Sci. Stat. Comput.*, vol. 10, no. 1, pp. 53-57, January 1989.

Many modifications will be apparent to those skilled in the art without departing from the scope of the present invention as herein described with reference to the accompanying drawings.

The invention claimed is:

1. A transmitter of a DFT-based communications system including:
an orthogonal precoder for transforming modulated data symbols using a unitary transform that controls out-of-band power;
wherein the data symbols are mapped to subcarriers of the transmitter and the computational complexity of said transform is linear with respect to the number of the subcarriers,
wherein said transform is a generalised Householder transform,
wherein a block reflector is the generalised Householder transform, and said precoder generates a precoded symbol vector $$\xi = x - G(G^H x),$$

for each uncoded symbol vector x of the modulated data symbols, and G is a matrix that controls out-of-band power spectral density of the transmitter and $G^H$ is its conjugate transpose.

2. The transmitter as claimed in claim 1, wherein said precoder further applies a generalised Householder reflection on other subcarriers to reduce PAPR.

3. A transmitter of a DFT-based communications system including:
an orthogonal precoder for transforming modulated data symbols using a unitary transform that controls out-of-band power;
wherein the data symbols are mapped to subcarriers of the transmitter and the computational complexity of said transform is linear with respect to the number of the subcarriers,
wherein said transform is generalised Householder transform,
wherein said generalised Householder transform uses successive Householder reflections by applying a predetermined set of Householder vectors $g_1, \ldots, g_R$, and the precoder generates a precoded symbol vector ξ from each uncoded symbol x of the modulated data symbols by executing:

a) Set i:=1 and set ξ:=x,
b) Update ξ so that ξ:=ξ−$g_i(g_i^H$ ξ),
c) Increment i,
d) If i≤R, repeat from step b), otherwise finish and R is a constant.

4. The transmitter as claimed in claim 3, wherein said precoder further applies a generalised Householder reflection on other subcarriers to reduce PAPR.

5. A transmitter of a DFT-based communications system including:
an orthogonal precoder for transforming modulated data symbol using a unitary transform that controls out-of-band power;
wherein the data symbol are mapped to subcarriers of the transmitter and the computational complexity of said transform is linear with respect to the number of the subcarriers,
wherein said transform is a generalised Householder transform,
wherein said generalised Householder transform uses a WY representation and Householder vectors $g_1, \ldots, g_R$ are combined into matrices W and Y by performing:
a) Set W:=−$g_1$, Y:=$g_1$ and i:=2,
b) Update W and Y so that W:=(W, −$g_i$−WY$^H g_i$) and Y:=(Y,$g_i$),
c) Increment i,
d) If i≤R, repeat from step b), otherwise finish; and
R is a constant and a precoded symbol vector ξ is generated from each uncoded symbol x of the modulated data symbols by executing ξ=x+W(Y$^H$x).

6. The transmitter as claimed in claim 5, wherein said precoder further applies a generalised Householder reflection on other subcarriers to reduce PAPR.

7. A receiver of a DFT-based communications system including:
an orthogonal decoder that controls out-of-band power using a unitary transform for recovering modulated data symbols from precoded symbol vectors having data symbols allocated to subcarriers of the receiver, wherein that the computational complexity of the transform is linear with respect to the number of the subcarriers,
wherein said transform is a generalised Householder transform, and
using a block reflector as the generalised Householder transform, wherein the decoder recovers the uncoded symbol vector $$x=ξ-G(G^H ξ),$$

of the modulated data symbols from each received precoded symbol vector ξ, where G is a matrix that controls out-of-band power spectral density and G$^H$ is its conjugate transpose.

8. The receiver as claimed in claim 7, wherein said decoder further applies a generalised Householder reflection to recover modulated data symbols of other subcarriers encoded to reduce PAPR.

9. A receiver of a DFT-based communications system including:
an orthogonal decoder that controls out-of-band power using a unitary transform for recovering modulated data symbols from precoded symbol vectors having data symbols allocated to subcarriers of the receiver, wherein, that the computational complexity of the transform is linear with respect to the number of the subcarriers,
wherein said transform is generalised Householder transform, and
wherein said generalised Householder transform uses successive Householder reflections by applying a predetermined set of Householder vectors $g_1, \ldots, g_R$, in an opposite order to decode precoded symbols.

10. The receiver as claimed in claim 9, wherein said decoder further applies a generalised Householder reflection to recover modulated data symbols of other subcarriers encoded to reduce PAPR.

11. A receiver of a DFT-based communications system including:
an orthogonal decoder that controls out-of-band power using a unitary transform for recovering modulated data symbols from precoded symbol vectors having data symbols allocated to subcarriers of the receiver, wherein that the computational complexity of the transform is linear with respect to the number of the subcarriers,
wherein said transform is a generalised Householder transform, and
wherein said generalised Householder transform uses a WY matrix representation and each received precoded symbol vector ξ is decoded to recover an uncoded symbol vector of said data symbols by executing x=ξ+W(Y$^H$ξ).

12. The receiver as claimed in claim 11, wherein said decoder further applies a generalised Householder reflection to recover modulated data symbols of other subcarriers encoded to reduce PAPR.

13. An orthogonal precoding process for a DFT based communications systems, including:
receiving modulated data symbols as a data vector; and
applying a unitary transform to said data vector that controls out-of-band power,
wherein said transform is a generalised Householder transform, and
wherein a block reflector is the generalized Householder transform, and the process generates a precoded symbol vector $$ξ=x-G(G^H x),$$

for each uncoded symbol vector x of the modulated data symbols, and G is a matrix that controls out-of-band power spectral density of a transmitter and G$^H$ is it conjugate transpose.

14. The orthogonal precoding process as claimed in claim 13, further including using a generalised Householder reflection on subcarriers of a transmitter to reduce PAPR and in a receiver to recover modulated data symbols of the subcarriers.

15. An orthogonal precoding process for a DFT based communications systems, including:
receiving modulated data symbols as a data vector; and
applying a unitary transform to said data vector that controls out-of-band power,
wherein said transform is a generalised Householder transform, and
wherein said generalised Householder transform uses successive Householder reflections by applying a predetermined set of Householder vectors $g_1, \ldots, g_R$, and the process generates a precoded symbol vector ξ from each uncoded symbol x of the modulated data symbols by executing:
d) Set i:=1 and set ξ:=x,
e) Update ξ so that ξ:=ξ−$g_i(g_i^H$ξ),
f) Increment i, d) If i≤R, repeat from step b), otherwise finish and R is a constant.

16. The orthogonal precoding process as claimed in claim 15, further including using a generalised Householder reflection on subcarriers of a transmitter to reduce PAPR and in a receiver to recover modulated data symbols of the subcarriers.

17. An orthogonal precoding process for a DFT based communications systems, including:
- receiving modulated data symbols as a data vector; and
- applying a unitary transform to said data vector that control out-of-band power,
- wherein said transform is a generalised Householder transform, and
- wherein said generalised Householder transform uses a WY representation and Householder vectors $g_1, \ldots, g_R$ are combined into matrices W and Y by performing:
- e) Set $W:=-g_1$, $Y:=g_1$ and $i:=2$,
- f) Update W and Y so that $W:=(W, -g_i - WY^H g_i)$ and $Y:=(Y, g_i)$,
- g) Increment i,
- h) If i≤R, repeat from step b), otherwise finish; and
- R is a constant and a precoded symbol vector ξ is generated from each uncoded symbol x of the modulated data symbols by executing $\xi = x + W(Y^H x)$.

18. The orthogonal precoding process as claimed in claim 17, further including using a generalised Householder reflection on subcarriers of a transmitter to reduce PAPR and in a receiver to recover modulated data symbols of the subcarriers.

* * * * *